United States Patent [19]

Samson

[11] Patent Number: 5,026,314

[45] Date of Patent: Jun. 25, 1991

[54] MAGNETICALLY ACTUATED AMUSEMENT DEVICE

[76] Inventor: Ilan Samson, 62 Eshkol Street, Tel Aviv, Israel

[21] Appl. No.: 461,029

[22] Filed: Jan. 4, 1990

[30] Foreign Application Priority Data

Jan. 4, 1989 [GB] United Kingdom ............... 8900064

[51] Int. Cl.⁵ ............................................. A63H 33/26
[52] U.S. Cl. .................................. 446/133; 272/8 R; 335/306
[58] Field of Search ............... 446/133, 129, 131, 132, 446/134, 135, 136, 419; 40/426, 613; 434/276; 272/8 N, 8 R; 335/209, 306; 368/179; 273/1 M

[56] References Cited

U.S. PATENT DOCUMENTS 3,550,936 12/1970 Puttick ................................ 272/8 N
3,621,424 11/1971 Query ............................... 335/306 X
3,717,951  2/1973 Ljungdahl ........................... 446/130
4,011,674  3/1977 Jacobson ......................... 446/133 X

FOREIGN PATENT DOCUMENTS 1278328  6/1972 United Kingdom ............... 446/133

OTHER PUBLICATIONS

"Hula-Balls", The Sunday Star, Washington, D.C., 12/15/1968, p. A-37.

Primary Examiner—Mickey Yu
Attorney, Agent, or Firm—Abelman Frayne Rezac & Schwab

[57] ABSTRACT

A magnetically actuated amusement device includes a supporting structure having side pieces which pivotally support rigid suspending elements each having a permanent magnet at its lower end. The magnets are arranged in a row, such that they will repel the next magnet in the row, the motion of the magnets being constricted to swinging in the vertical plane containing the row.

8 Claims, 4 Drawing Sheets

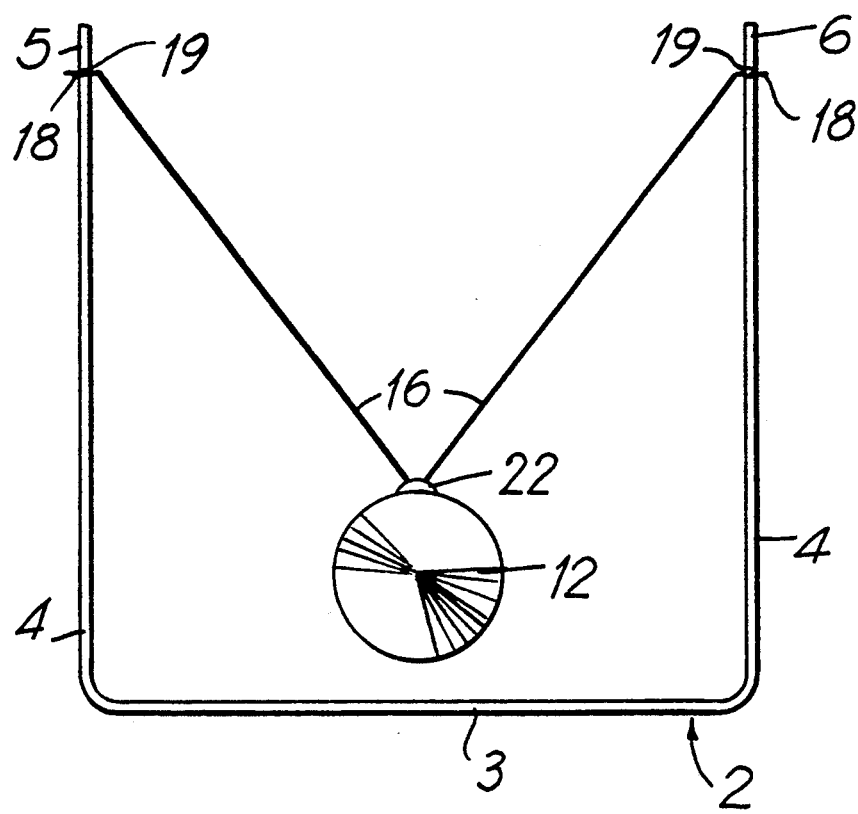
FIG. 4
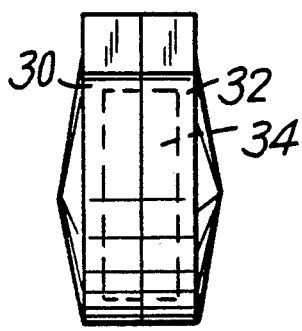
FIG. 5
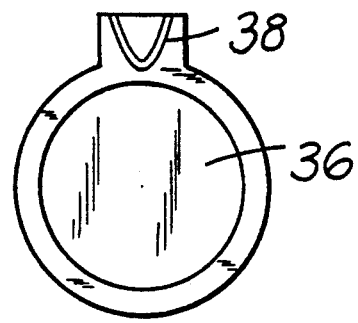

MAGNETICALLY ACTUATED AMUSEMENT DEVICE

FIELD OF THE INVENTION

This invention relates to an magnetically actuated apparatus for amusement providing an interesting motion of its parts.

SUMMARY OF THE INVENTION

The apparatus of this invention comprises:

a supporting structure, at least two permanent magnets arranged in a row and spaced one from the next, each magnet being suspended from the structure by means of a suspending element including pivot portions by which said element is pivotally mounted on the structure so as to pivot around an axis extending transversely of the row, whereby each of the magnets in the row is displaceable both towards and away from its neighboring magnets in the row and is able to swing repeatedly as a pendulum, each suspending element comprising rigid material extending from its pivot paths to its magnet, thereby to constrain its magnet to swing only in an arc extending generally along the row, each magnet being secured to its suspending element, with adjacent magnets in the row oriented such that there is mutual repulsion between them.

It will usually be desirable that the axis of each magnet (i.e. its North-South direction) will be aligned along the direction of the said row of magnets.

The strength of the magnets should be sufficient that swinging motion of one magnet is transmitted through the mutual repulsion to the next magnet(s) in the row (and such that magnets moving towards each other will not normally touch).

With such an arrangement, motion of any one magnet sets the others in motion, and the motion is transmitted from end to end along the row.

As one magnet approaches another, the mutual repulsion retards the approaching magnet, but accelerates the other magnet to move away from the approaching magnet. Although the magnets do not touch, the effect is somewhat similar to collision in that kinetic energy is transferred from one magnet to the other. The effect is also somewhat different because the magnetic fields act at a distance so that transfer to kinetic energy occurs during a section of the travel of the magnets rather than at the (single) point of contact as with the collision of non-magnetic bodies.

The motion described by the magnets when one of them is set swinging bears some resemblance to the behaviour of a row of hard spheres, but is more complex. As one magnet approaches the next and repels it, that one is also approaching and repelling a third magnet. Moving one magnet in the row and letting it swing sets all the magnets in motion to some degree, and a complex motion of the magnets is observed.

The interaction of the magnets without one touching another is a striking sight. Another striking feature is the length of time during which motion will continue without any further impetus being given to the system. Motion has been observed to continue for much longer than with a row of hard spheres which undergo collision by touching.

Although the number of magnets in the row may be as few as two, it is desirable to employ at least three so that motion can be transmitted from one end to the other through at least one magnet intermediately between the end. The number of magnets preferably lies in the range from four to seven, with five being the most preferred number.

A very significant feature of the invention is the suspension of the magnets in a manner which constrains them to move only in a predetermined arc. This keeps them oriented to repel adjacent magnets and prevents them from jumping out of their intended paths of motion to positions at which two magnets can attract each other and become held to each other.

Even with the rigid suspending elements required by this invention, it is possible (depending on dimensions) that if two adjacent magnets swing through a sufficient arc, they will no longer be face to face and repelling each other, but instead reach a position at which they are edge to edge so that the magnets can become held together by attraction between their unlike poles.

This possibility is affected by the relationship between certain dimensions. Particularly significant are the spacing between the pivot axes of adjacent suspending elements and the dimension of each magnet in a direction radially from the pivot axis of its suspending element. The latter is the height of the magnet when hanging vertically downwards and for convenience will be referred to as the "height".

If the spacing between adjacent pivot axes is less than the heights of the associated magnets, then they will not reach the edge to edge condition at which they become held together by attraction, even if they are swung upward through 90° in the same direction. If the spacing is more than the heights of the magnets it is possible for the magnets to reach an edge to edge condition and become held together. However, if the spacing is not much more than the heights, the magnets will not reach an edge to edge condition and become held together until they have been swung upwardly through a substantial angle.

Generally it is sufficient to choose the dimensions such that adjacent magnets cannot become held together until they have swung upwardly through at least 60°.

An alternative, but not preferred, possibility will be to suspend the magnets with a spacing between pivot axes which is substantially greater than the rest heights of the magnets, for example 3 or 4 times as much.

Another way to express suitable spacing of the pivot axes is that the spacing between the pivot axes of adjacent magnets should either be less than about 1.5 times the height of a magnet or should be at least about as great as the distance from a pivot axis to the further edge of the magnet suspended from the axis.

Generally the lengths of the suspending elements will be greater than the spacing between their axes. Thus, the length of each suspending element, from the centre of the magnet to the pivot axis is preferably more than twice the spacing between the pivot axes of adjacent elements.

The strength of the magnets is a significant consideration. As a practical guide, the magnetic repuls should be strong enough that if two adjacent magnets are each swung up to 50° to the vertical in opposite directions and released, so as to fall towards each other, they do not touch each other. Better, they should not touch even if released from an angle of 60° to the vertical.

In a convenient constructional arrangement, the supporting structure includes side members at either side of the row of magnets and each suspending element is pivotally mounted in or on both side members.

The suspending elements need to be sufficiently rigid to keep the magnets in their intended paths of movement. Convenient possibilities are a V-shape or T-shape, made from stiff, non-magnetic wire with the upper extremities of the V or T pivotally mounted in the side members and the magnet secured to the base of the V or T. The upper ends of a V-shaped suspending element may be connected by a cross-piece, so that the V-shape becomes an inverted triangle. Suspending elements may be moulded from plastic with such a triangular shape.

Securing of the magnets to their suspending elements can be accomplished in various ways. One possibility is for them to be glued together with a blob of adhesive or resin. Another possibility is for each magnet to be surrounded by a casing moulded in two parts which fit together and surround both the magnet and the lower part of its suspending element, thereby attaching them together. A moulded plastic suspending element may include an integral mounting into which a magnet will force fit.

An embodiment of the invention will now be described in detail, with reference to the accompanying drawings, wherein:

FIG. 3 is an end view thereof;

FIG. 4 is a side view of an alternative magnet casing;

FIG. 5 is a section on line V—V of FIG. 4;

Figure 1:
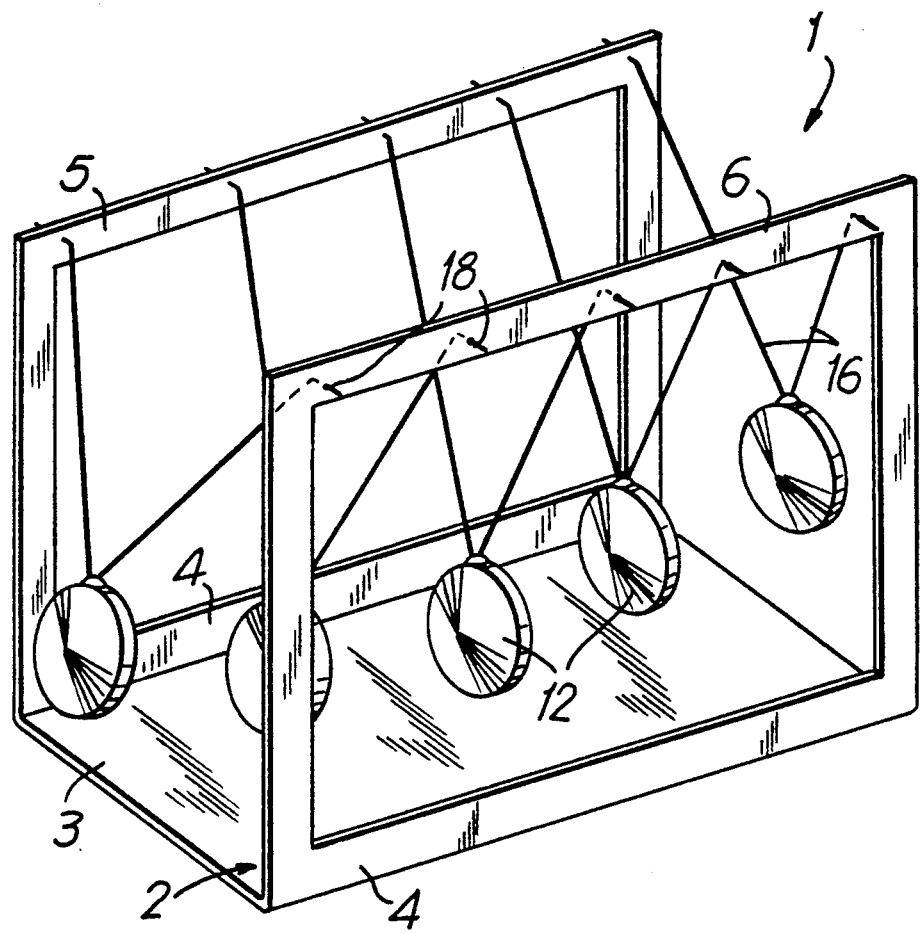
FIG. 1 is a perspective view of one embodiment of the apparatus according to the invention.

The apparatus has a supporting structure, referred to as a frame, shown generally as 2 in FIG. 1. This comprises a flat, continuous, horizontal base 3 and parallel vertical sides 4, forming a channel section. Each side 4 has a cut away central portion, as seen in FIG. 1. This allows a relatively unobstructed view of, and access to the elements 12 of the apparatus.

The frame 2 may be made of any suitable hard, rigid material. Preferably it is moulded from transparent plastic.

Pivotally mounted in the frame 2 are five suspending elements 16. Each is formed from a length of stout metal wire bent into a symmetrical V-shape with its upper free ends 18 turned outwardly. The suspending element could alternatively be formed by a plastic moulding.

The free ends 18 of each suspending element 16 engage in holes 19 in upper parts 5,6 of the frame and are free to pivot in these holes 19. Thus each suspending element is pivoted to the frame to swing about an axis extending across the frame from one side to the other.

It is desirable that the suspending elements 16 should have some resilience, so that the free ends 18 can be inserted in the pivot holes 19 by simply forcing the ends 18 together slightly, aligning the ends 18 with the holes 19, and then releasing them. This could allow the user to remove some suspending elements, or to change their spacing by moving them to alternative pivot holes (not shown). Another possibility is that the suspending elements can be fitted or removed by pulling the top edges of the sides 4 away from each other, instead of pushing the ends 18 together.

At the bottom of each V-shaped suspending element 16 there is a magnetic element 12 consisting of a permanent magnet which may possibly be encased in a protective casing of thermosetting resin. Each element 12 is approximately a disc, but with slightly conical faces 14. The suspending element 16 is secured to the magnetic element 12 with a blob of the resin or of an adhesive.

As can be seen from the drawings the magnetic elements 12 are spaced apart in a row. The magnet within each magnetic element 12 is oriented with its north-south direction generally in the longitudinal direction of the row. Adjacent magnets are oriented with like poles facing each other, so that there is mutual repulsion therebetween.

In the embodiment shown, there are five such magnetic elements 12 and suspending elements 16. However, a different number may be used depending on the length of the frame and the size of the apparatus required.

Figure 2:
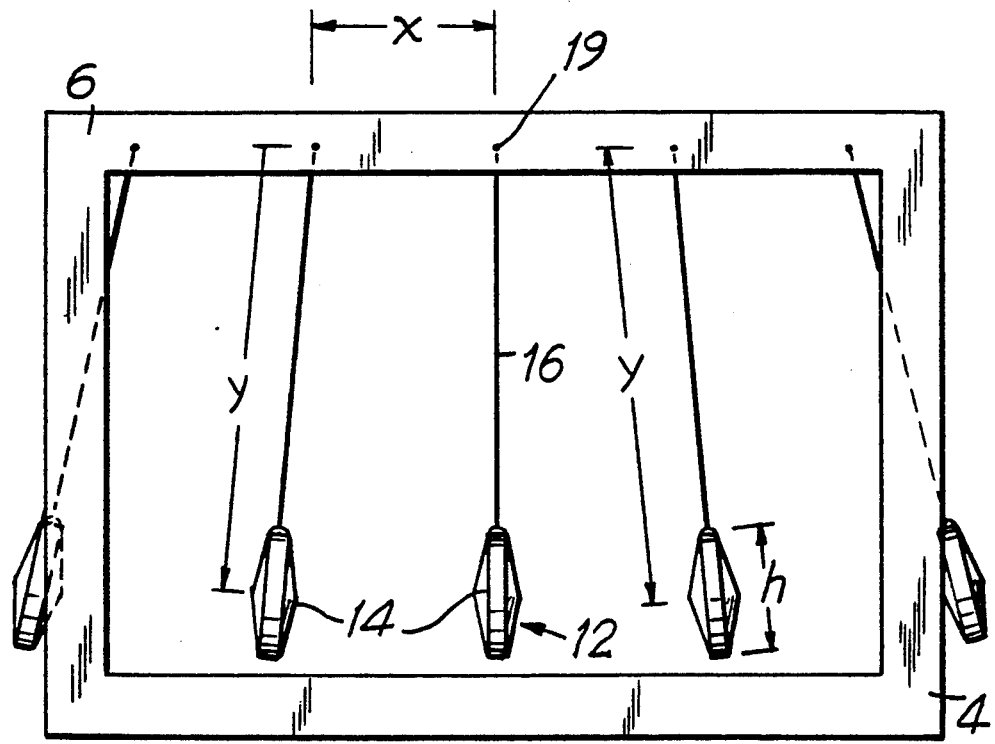
FIG. 2 is a side view thereof.

The axes around with the suspending elements pivot are spaced apart, one from the next, by a distance x. The relative disposition of the magnetic elements 12, when at rest, is shown in FIG. 2. Mutual repulsion between adjacent elements spaces them apart by more than the distance x. The outer suspending elements do not hang vertically.

Each magnetic element 12 is suspended, by means of its suspending element 16 to swing as a pendulum with the magnetic element moving in an arc which extends in the longitudinal direction of the row of elements 12. It is retained in this arc by reason of the rigidity of the suspending element 16.

The parts of the apparatus may be set in motion by moving any magnetic element 12. For example an endmost magnetic element is swung upwardly and outwardly from the frame and released. A regular but complex motion results. It continues for some time until damped by friction, air resistance and any hysteresis losses. Motion has been observed to continue for as long as 25 minutes.

If two adjacent magnetic elements 12 are displaced together in the same longitudinal direction, due to the spacing of the pivot holes 19 (designated x in FIG. 2), the two elements instead of remaining in substantially face to face relationship can approach to substantially edge to edge relationship, which may result in the two magnets mutually attracting. During the normal oscillating motion of the parts this should not occur, and can be substantially prevented by selecting the height h in relation to the spacing x, so that the two magnetic elements 12 are not sufficiently in a side to side relation so as to attract each other until their supporting elements are at an angle of at least 70° to the vertical.

Allowing two elements to become held together at such a high angle may be useful in enabling two elements to be held up, out of the way. The motion of the remaining three elements can then be seen.

As is preferred, although not essential, the spacing between each pair of adjacent pivot axes is the same. The heights h of the magnetic elements 12 are equal. The lengths of the suspending elements 16 are also equal to each other. They are such that the distance y is more than twice the spacing x which does not exceed 1½ times the height h. If the less preferred possibility of a wide spacing x between pivot axes is used, x should then be approximately equal to, greater than, $y + \frac{1}{2} h$.

FIGS. 4 and 5 illustrate a modified enclosure for a magnet. As shown by FIG. 4, which is a side view, it is made in two halves 30, 32 which receive a cylindrical magnet 34.

FIG. 5 shows the interior of one half 32. It has a central cavity 36 to receive one end of the magnet and a groove 38 to receive the bottom part of a suspending element 16. The other half has a similar cavity and groove. The two halves are fitted together around a magnet 34 and the bottom end of a suspending element and thereby secure the magnet to the suspending element.

Figure 6:
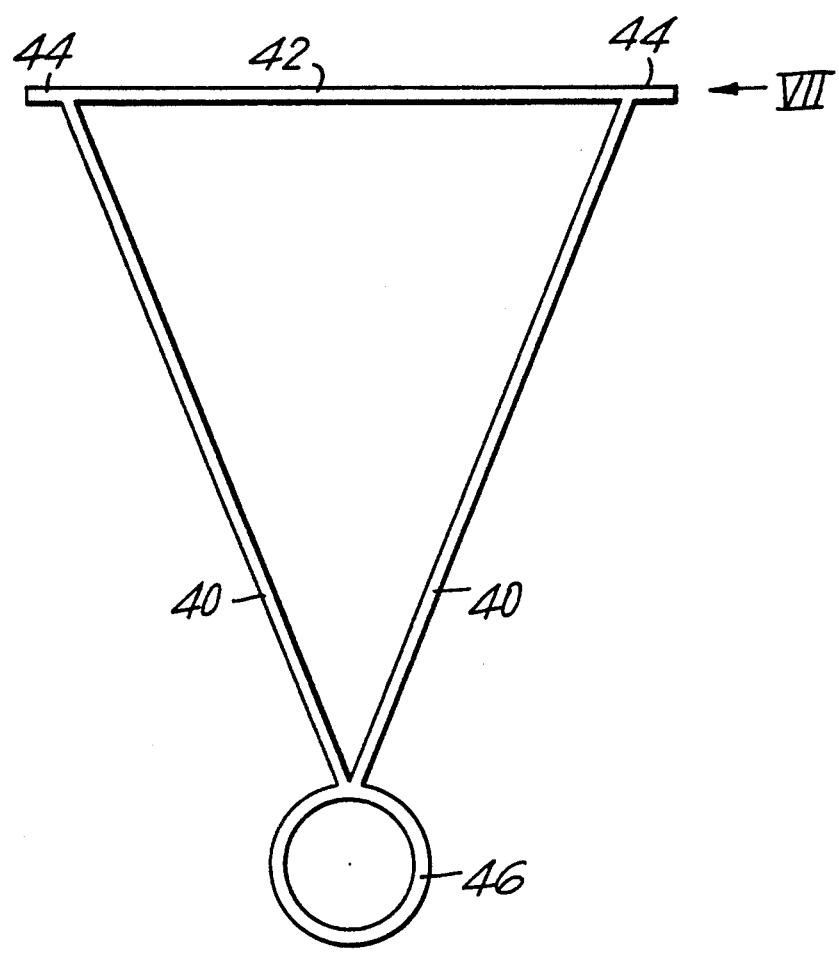
FIG. 6 shows an alternative suspending element.
Figure 7:
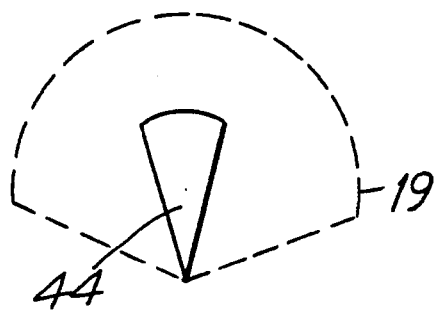
FIG. 7 is an enlarged view on arrow VII of FIG. 6.

FIGS. 6 and 7 illustrate an alternative suspending element. It is a one-piece plastic moulding with two descending portions 40 joined by a cross-piece 42. Extensions 44 of the cross-piece are inserted into holes 19 in the supporting structure, analogously to the end portions 18 shown in FIG. 3. At the base of the descending portions 40 there is a ring 46 into which a disc-shaped magnet can be fitted. The internal diameter of the ring 46 is arranged so that the magnet is a (gentle) force fit.

FIG. 7 shows the cross-section of an extension 44. It is a narrow V-shape and gives a knife edge pivot in a hole 19 which incorporates a wider V-shaped lower edge. The end portions 18 shown in FIG. 3 may likewise be shaped to provide a knife edge pivot.

Figure 8:
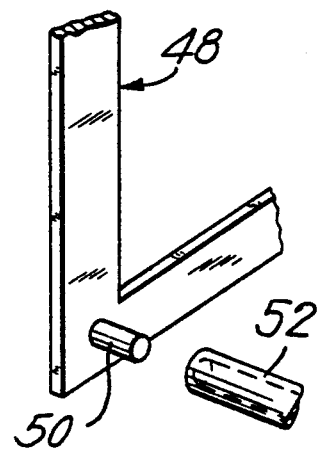
FIG. 8 is a detail of an alternative supporting structure.

FIG. 8 illustrates an alternative supporting structure. The Figure shows an inside lower corner of one side piece.

This supporting structure has two side pieces 48 which have the same appearance as the sides 4 in FIG. 1, i.e. each is rectangular with a cut out central area. However, each side piece 48 is a separate plastic moulding and has a dowel 50 projecting inwardly from each lower corner. The two side pieces are connected after moulding by pushing the dowels into the ends of the two plastic tubes 52 which form the base of the structure. The dowels 50 are dimensioned to be a (gentle) force fit in the tubes 52. In FIG. 8 the end of one tube 52 is shown ready for the dowel 50 to be pushed into it.

I claim:

1. An apparatus for amusement, comprising:
a supporting structure,
at least two permanent magnets arranged in a row and spaced one from the next, each magnet being suspended from the structure by means of a suspending element including pivot portions by which said element is pivotally mounted on the structure so as to pivot around an axis extending transversely of the row whereby each of the magnets in the row is displaceable both towards and away from its neighbouring magnets in the row and is able to swing repeatedly as a pendulum;
each suspending element comprising rigid material extending from its pivot parts to its magnet, thereby to constrain motion of its magnet only to swinging in an arc extending generally along the row.
each magnet being secured to its suspending element, with adjacent magnets in the row oriented such that there is mutual repulsion between them.

2. Apparatus according to claim 1 wherein the axis of each magnet between the poles thereof is aligned along the direction of the said row of magnets.

3. Apparatus according to claim 1 wherein the number of magnets in the row lies in the range from four to seven.

4. Apparatus according to claim 1 wherein the spacing between the pivot axes of successive magnets in the row is such that the magnets continue to repel each other while swinging until swung upwardly through at least 60°.

5. Apparatus according to claim 1 wherein the supporting structure comprises a pair of upright side members disposed one at each side of the row, with each suspending element pivotally mounted to both side members.

6. Apparatus according to claim 1 wherein the magnets are disc-shaped.

7. Apparatus according to claim 1 wherein the suspending elements are detachable from the supporting structure.

8. Apparatus according to claim 1, further including at least four but no more than seven said permanent magnets.

* * * * *